US012716620B2

(12) United States Patent
Legg et al.

(10) Patent No.: US 12,716,620 B2
(45) Date of Patent: Aug. 25, 2026

(54) USING CARBON DIOXIDE FROM A DIRECT AIR CAPTURE SYSTEM AS A LOW GLOBAL WARMING CAR AND INDUSTRIAL REFRIGERANT

(71) Applicant: AirMyne, Inc., Berkeley, CA (US)

(72) Inventors: Flynn Corrigan Michael Legg, Oakland, CA (US); Bart Ludo Scherpbier, San Francisco, CA (US); Ngoc The Pham, San Jose, CA (US); Le-Xuan Diec, Berkeley, CA (US); Mark Patrick Cyffka, El Cerrito, CA (US); Sudip Mukhopadhyay, Berkeley, CA (US)

(73) Assignee: Airmyne, Inc., Berkeley, CA (US)

( * ) Notice: Subject to any disclaimer, the term of this patent is extended or adjusted under 35 U.S.C. 154(b) by 73 days.

(21) Appl. No.: 18/440,373

(22) Filed: Feb. 13, 2024

(65) Prior Publication Data

US 2024/0328681 A1 Oct. 3, 2024

Related U.S. Application Data

(63) Continuation of application No. 18/121,464, filed on Mar. 14, 2023, now Pat. No. 11,906,227, which is a (Continued)

(51) Int. Cl.
*F25B 9/00* (2006.01)
*B01D 53/14* (2006.01)
(Continued)

(52) U.S. Cl.
CPC .......... *F25B 9/006* (2013.01); *B01D 53/1475* (2013.01); *B01D 53/1493* (2013.01);
(Continued)

(58) Field of Classification Search
CPC .. F25B 9/006; F25B 9/008; F25B 9/08; F25B 5/02; F25B 30/02; F25B 2309/061;
(Continued)

(56) References Cited

U.S. PATENT DOCUMENTS

| | | | |
|---|---|---|---|
| 4,012,206 A | 3/1977 | Macriss | F24F 3/1423 95/137 |
| 5,215,498 A | 6/1993 | Wong | F24F 11/0001 236/44 C |

(Continued)

FOREIGN PATENT DOCUMENTS

| | | | |
|---|---|---|---|
| CN | 102686957 A * | 9/2012 | F25B 9/008 |
| CN | 105966225 | 9/2016 | |

(Continued)

OTHER PUBLICATIONS

JPO, Notice of Allowance issued in Application No. 2023-209994 on Nov. 29, 2024, 4 pages.

(Continued)

*Primary Examiner* — Emmanuel E Duke
(74) *Attorney, Agent, or Firm* — Henry Patent Law Firm PLLC

(57) ABSTRACT

An apparatus includes a captured carbon dioxide input. The captured carbon dioxide input is coupled to receive captured carbon dioxide from a direct air capture system. The apparatus uses the captured carbon dioxide as a low global warming refrigerant to provide cooling functionality in automotive, commercial, and industrial applications, or other operations involving low global warming refrigerants. In various embodiments, the apparatus is a refrigeration apparatus or a heat pump apparatus. Low global warming carbon dioxide refrigerant is natural, non-toxic, non-flammable, and abundant when obtained from a direct air capture system. Moreover, carbon dioxide refrigerant has a high heat transfer coefficient and has a global warming potential (Continued)

CARBON PROCESSING SYSTEM (GWP) of one. Carbon dioxide refrigerant is a more sustainable and efficient coolant option than common refrigerants, such as R22, R152, R404a, and R1234yf refrigerants.

18 Claims, 8 Drawing Sheets

Related U.S. Application Data continuation of application No. 18/101,068, filed on Jan. 24, 2023, which is a continuation-in-part of application No. 18/091,315, filed on Dec. 29, 2022, now Pat. No. 11,801,476, and a continuation-in-part of application No. 17/948,492, filed on Sep. 20, 2022, now Pat. No. 11,612,853, said application No. 18/091,315 is a continuation-in-part of application No. 17/948,492, filed on Sep. 20, 2022, now Pat. No. 11,612,853.

(60) Provisional application No. 63/295,942, filed on Jan. 2, 2022.

(51) Int. Cl.

| | |
|---|---|
| ***B01D 53/62*** | (2006.01) |
| ***B01D 53/78*** | (2006.01) |
| ***F25B 5/02*** | (2006.01) |
| ***F25B 9/08*** | (2006.01) |
| ***F25B 45/00*** | (2006.01) |
| *F25B 30/02* | (2006.01) |

(52) U.S. Cl.

CPC ............. *B01D 53/62* (2013.01); *B01D 53/78* (2013.01); *F25B 5/02* (2013.01); *F25B 9/008* (2013.01); *F25B 9/08* (2013.01); *F25B 45/00* (2013.01); *B01D 2252/103* (2013.01); *B01D 2252/2023* (2013.01); *B01D 2257/504* (2013.01); *F25B 30/02* (2013.01); *F25B 2309/061* (2013.01); *F25B 2400/06* (2013.01); *F25B 2500/09* (2013.01)

(58) Field of Classification Search

CPC .. F25B 2400/06; F25B 2500/09; F25B 13/00; F25B 1/10; B01D 53/1475; B01D 53/1493; B01D 53/62; B01D 53/78; B01D 2252/103; B01D 2252/2023; B01D 2252/20494; B01D 2257/504; B01D 2251/30; B01D 2251/606; Y02C 20/40

See application file for complete search history.

(56) References Cited

U.S. PATENT DOCUMENTS 5,221,520 A 6/1993 Cornwell .................. A61L 9/16 422/4
9,205,375 B2 12/2015 Jones et al.
9,925,488 B2 * 3/2018 Eisenberger ........... B01D 53/06
11,612,853 B1 3/2023 Mukhopadhyay et al.
11,801,476 B2 10/2023 Mukhopadhyay et al.
11,906,227 B2 2/2024 Legg et al.
12,005,390 B1 6/2024 Mukhopadhyay et al.
2007/0271943 A1 11/2007 Baruschuke et al.
2008/0295580 A1 * 12/2008 Minor .................... G01N 21/33 73/40.7
2009/0120288 A1 5/2009 Lackner et al.
2011/0296872 A1 * 12/2011 Eisenberger ........... B01D 53/81 96/111
2013/0230442 A1 9/2013 Wei et al. ............. B01D 53/62 423/228
2013/0340616 A1 12/2013 Iyer
2014/0123850 A1 5/2014 Bedell
2014/0145110 A1 * 5/2014 Eisenberger .......... F01N 3/0857 252/189
2014/0251136 A1 9/2014 Park
2015/0197425 A1 7/2015 Hayashi
2015/0258488 A1 9/2015 Meirav ................... F24F 13/00 96/144
2016/0016108 A1 1/2016 Park
2016/0262987 A1 * 9/2016 Bublewitz ................ A61K 6/61
2017/0252693 A1 9/2017 Kuroda ..................... F24F 8/15
2017/0256812 A1 9/2017 Yoon .................. H01M 8/1004
2017/0354925 A1 * 12/2017 Heidel .................... F28F 25/06
2018/0117530 A1 5/2018 Pleissner
2018/0214822 A1 8/2018 Eisenberger
2019/0039047 A1 2/2019 Kimura et al. .......... B01J 20/32
2019/0161659 A1 * 5/2019 Kujak ..................... F25B 45/00
2019/0193019 A1 6/2019 Okano ................... B01D 53/06
2020/0114306 A1 4/2020 Miyamoto ......... B01D 53/1418
2020/0129916 A1 * 4/2020 Constantz .......... B01D 53/1475
2020/0206675 A1 7/2020 Kim ..................... F24F 11/0001
2020/0346165 A1 11/2020 Lu
2020/0353798 A1 11/2020 Kim
2021/0120750 A1 * 4/2021 Bourhis ................. B01D 53/62
2021/0129072 A1 * 5/2021 Deng ..................... B01D 53/14
2021/0245092 A1 8/2021 Liu
2021/0300765 A1 * 9/2021 GilroySmith ......... F25B 25/005
2022/0088613 A1 3/2022 Hopkins
2022/0136119 A1 * 5/2022 Flanders ................... C12P 7/06 435/71.1
2022/0176312 A1 6/2022 Olmstead ........... B01D 53/1475
2022/0193606 A1 6/2022 Nold ........................ B01J 4/002
2022/0355832 A1 11/2022 Bachman
2024/0024822 A1 1/2024 Merrill
2024/0299877 A1 9/2024 Mukhopadhyay et al.
2025/0153096 A1 5/2025 Scherpbier

FOREIGN PATENT DOCUMENTS

CN 107101407 8/2017
CN 108458512 8/2018
CN 108458512 A * 8/2018 .............. F25B 9/008
CN 110796581 2/2020
CN 110849073 2/2020
CN 112126477 12/2020
CN 213984106 8/2021
CN 213984106 U * 8/2021
CN 113401903 9/2021
CN 113405164 A 9/2021
CN 114777277 A 7/2022
EP 3842700 A1 6/2021
GB 2592707 8/2021
JP H07253254 10/1995
JP 2002316809 10/2002
JP 2006266523 10/2006
JP 2020094761 6/2020
JP 2022539406 9/2022
KR 20060064344 6/2006
KR 101811957 12/2017
KR 101811957 B1 * 12/2017 .............. F25B 40/02
KR 20220068445 5/2022
WO 2005108297 A2 5/2005
WO 2011137398 11/2011
WO 2011151549 12/2011
WO 2019161114 8/2019
WO 2021150722 A1 7/2021
WO 2021181483 9/2021
WO 2021189042 9/2021
WO WO-2021189042 A1 * 9/2021 ............. B01D 53/06
WO WO-2021230045 A1 * 11/2021 ............. B01D 53/82
WO 2022219114 10/2022
WO 2023130147 7/2023

OTHER PUBLICATIONS

JPO, Office Action issued in Application No. 2023-209994 on Jun. 18, 2024, 13 pages.
USPTO, Non-Final Office Action issued in U.S. Appl. No. 18/117,633 on Aug. 6, 2025, 37 pages.

(56) References Cited

OTHER PUBLICATIONS

USPTO, Non-Final Office Action issued in U.S. Appl. No. 18/670,072 on Oct. 2, 2025, 42 pages.
USPTO, Non-Final Office Action issued in U.S. Appl. No. 18/101,068 on Jul. 14, 2025, 42 pages.
USPTO, Non-Final Office Action issued in U.S. Appl. No. 18/101,068 on Dec. 5, 2025, 26 pages.
USPTO, Notice of Allowance issued in U.S. Appl. No. 18/117,633 on Dec. 10, 2025, 10 pages.

* cited by examiner

DISTRIBUTOR
12
PACKING
MATERIAL
13
REACTOR
(FIRST STAGE)
11
AIR TO CONTACT
BASE MEDIUM IN
REACTOR
(FIRST STAGE)
14
EXHAUST AIR WITH
$CO_2$ STRIPPED
18
AIR
(<800PPM $CO_2$)
AIR
MOVER
27
15
COLLECTION
RESERVOIR
17
PUMP
25
BASE MEDIUM
(LOW $CO_2$)
16
$CO_2$
DETECTOR
25
BASE MEDIUM
(LOW $CO_2$)
RESERVOIR
21
REACTOR
(SECOND STAGE)
19
MAKEUP
SYSTEM
22
20
BASE MEDIUM
(HIGH $CO_2$)
CONTROLLER
26
CONTROL
SIGNALS
SENSORS
24
HEAT
23
CARBON
DIOXIDE

CARBON PROCESSING SYSTEM

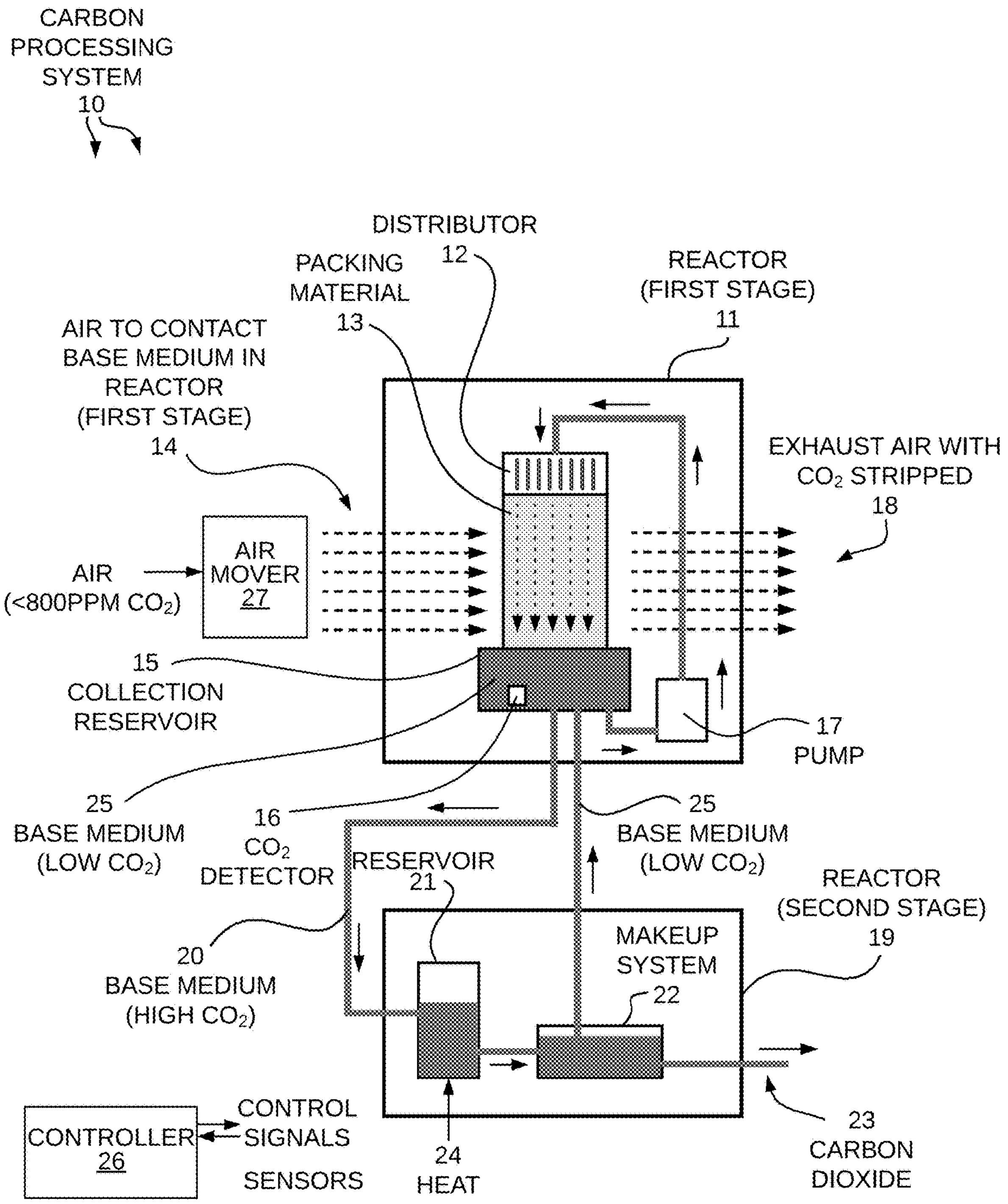

FIG. 1

REACTION DURING FIRST STAGE OF REACTOR (ABSORPTION REACTION)

REACTION IN SECOND STAGE OF REACTOR (DESORPTION REACTION)

CARBON PROCESSING SYSTEM

REFRIGERATION APPARATUS
(AUTOMOTIVE)

REFRIGERATION APPARATUS
(INDUSTRIAL)

HEAT PUMP APPARATUS
(INDUSTRIAL)

METHOD FOR UTILIZING DIRECTLY CAPTURED $CO_2$ IN AUTOMOTIVE, COMMERCIAL OR INDUSTRIAL APPLICATIONS

USING CARBON DIOXIDE FROM A DIRECT AIR CAPTURE SYSTEM AS A LOW GLOBAL WARMING CAR AND INDUSTRIAL REFRIGERANT

CROSS REFERENCE TO RELATED APPLICATIONS

This application is a continuation of, and claims the benefit under 35 U.S.C. § 120 from U.S. Nonprovisional patent application Ser. No. 18/121,464, entitled "Using Carbon Dioxide From A Direct Air Capture System As A Low Global Warming Car And Industrial Refrigerant," filed on Mar. 14, 2023. U.S. Nonprovisional patent application Ser. No. 18/121,464 is a continuation of, and claims the benefit under 35 U.S.C. § 120 from U.S. Nonprovisional patent application Ser. No. 18/101,068, entitled "Using Carbon Dioxide From A Direct Air Capture System As A Low Global Warming Car And Industrial Refrigerant," filed on Jan. 24, 2023. U.S. Nonprovisional patent application Ser. No. 18/101,068 is a continuation-in-part of, and claims the benefit under 35 U.S.C. § 120 from U.S. Nonprovisional patent application Ser. No. 18/091,315, entitled "Efficient And Fully Automated Catalytic Direct Carbon Dioxide Capture From Air System," filed on Dec. 29, 2022. U.S. Nonprovisional patent application Ser. No. 18/091,315 is a continuation-in-part of, and claims the benefit under 35 U.S.C. § 120 from U.S. Nonprovisional patent application Ser. No. 17/948,492, entitled "Fully Automated Direct Air Capture Carbon Dioxide Processing System," filed on Sep. 20, 2022. U.S. Nonprovisional patent application Ser. No. 18/101,068 is also a continuation-in-part of, and claims the benefit under 35 U.S.C. § 120 from U.S. Nonprovisional patent application Ser. No. 17/948,492, entitled "Fully Automated Direct Air Capture Carbon Dioxide Processing System," filed on Sep. 20, 2022. U.S. Nonprovisional patent application Ser. No. 18/091,315 and U.S. Nonprovisional patent application Ser. No. 17/948,492 in turn claim the benefit under 35 U.S.C. § 119 from U.S. Provisional patent application Ser. No. 63/295,942, entitled "Fully Automated Direct Air Capture Carbon Dioxide Processing System," filed on Jan. 2, 2022. The subject matter of each of the foregoing documents is incorporated herein by reference.

TECHNICAL FIELD

The present invention relates to scalable large-scale industrial applications of direct air capture carbon dioxide as a low global warming fluid in mobile or stationary refrigeration or heat pump applications.

BACKGROUND INFORMATION

Low global warming automobile refrigerant, HFO-1234yf (see Ref) or $CF_3CF{=}CH_2$ is a good drop in refrigerant for car industries. However, the entire supply chain associated with manufacturing a molecule like HFO-1234yf ($CF_3CF{=}CH_2$) is a different story altogether. There are significant carbon footprints and high energy requirements associated with the transformation of a hydrocarbon into chlorinated hydrocarbon then to fluorinated hydrocarbon and eventually to Hydrofluoro-olefins like HFO-1234yf. Moreover, the toxic and life-threatening work environment surrounding every step of the process is unavoidable. In the end, there is little potential of HFO-1234yf's low global warming effects at point source because so much carbon dioxide has already been released into the atmosphere during its manufacturing process. The definition of global warming of a molecule over 100 years is the ratio of global warming of a specific molecule to carbon dioxide global warming over 100 years. Carbon dioxide being 1 global warming potential over 100 years, there is no refrigerant which could lower global warming than carbon dioxide itself as a refrigerant. Although supercritical and subcritical carbon dioxide show good refrigeration efficiency, sourcing of carbon dioxide could create a carbon footprint mess as bad as the current HFO-1234yf that is being used. So, we intend to change that using our direct air capture carbon dioxide as the true low global warming automobile and industrial refrigerant.

In chemical manufacturing plants and downstream refinery processes, acidic gasses, including $H_2S$ and carbon dioxide, are quite often removed from a mixture of flue gasses with 15 to 50-wt % concentration using aqueous or alcoholic amine or metal carbonates as used in natural gas sweetening processes. Amine or carbonate react with carbon dioxide gas to form a salt, which can be reversibly broken into starting amine or carbonate and acidic gas at mildly elevated temperatures. However, the same processes that work for flue gas with concentration of carbon dioxide anywhere between 5-50-wt % do not work for direct air capture, which uses air as feedstock where often the concentration of carbon dioxide is only in the range of 400 to 700 ppm.

SUMMARY

An apparatus includes a captured carbon dioxide input. The captured carbon dioxide input is coupled to receive captured carbon dioxide from a direct air capture system. The apparatus uses the captured carbon dioxide as a low global warming refrigerant to provide heating or cooling functionality in automotive, commercial, and industrial applications, or other operations involving refrigerants. In various embodiments, the apparatus is a refrigeration apparatus or a heat pump apparatus.

Carbon dioxide refrigerant is low global warming, natural, non-toxic, non-flammable, and abundant when obtained from a direct air capture system. Moreover, carbon dioxide refrigerant has a high heat transfer coefficient and has a global warming potential (GWP) of one (1). Carbon dioxide refrigerant is a more sustainable and efficient coolant option than common refrigerants, such as R22, R404a, R152, or even R1234yf refrigerants.

The direct air capture system includes a continuous flow reactor operable in a first stage and a second stage. In the first stage, air reacts with a base solution in the presence of packing materials and gas liquid distributors to generate a base solution having carbon dioxide and to generate exhaust that is released from the reactor. The packing material is designed to maximize contact between the air and the base solution. The exhaust is "clean air" having less carbon dioxide than air received into the continuous flow reactor. In the second stage, the base solution having carbon dioxide is heated to generate carbon dioxide in the presence of a catalyst and to generate a base solution without carbon dioxide. The base solution is recirculated into the first stage thereby providing continuous carbon processing functionality. The carbon dioxide is further processed for injection into the apparatus and usable as a low global warming refrigerant.

Further details and embodiments and methods are described in the detailed description below. This summary does not purport to define the invention. The invention is defined by the claims.

BRIEF DESCRIPTION OF THE DRAWINGS

The accompanying drawings, where numerals indicate like components, illustrate embodiments of the invention.

FIG. 1 is a diagram of a carbon processing system.

DETAILED DESCRIPTION

Figure 2:
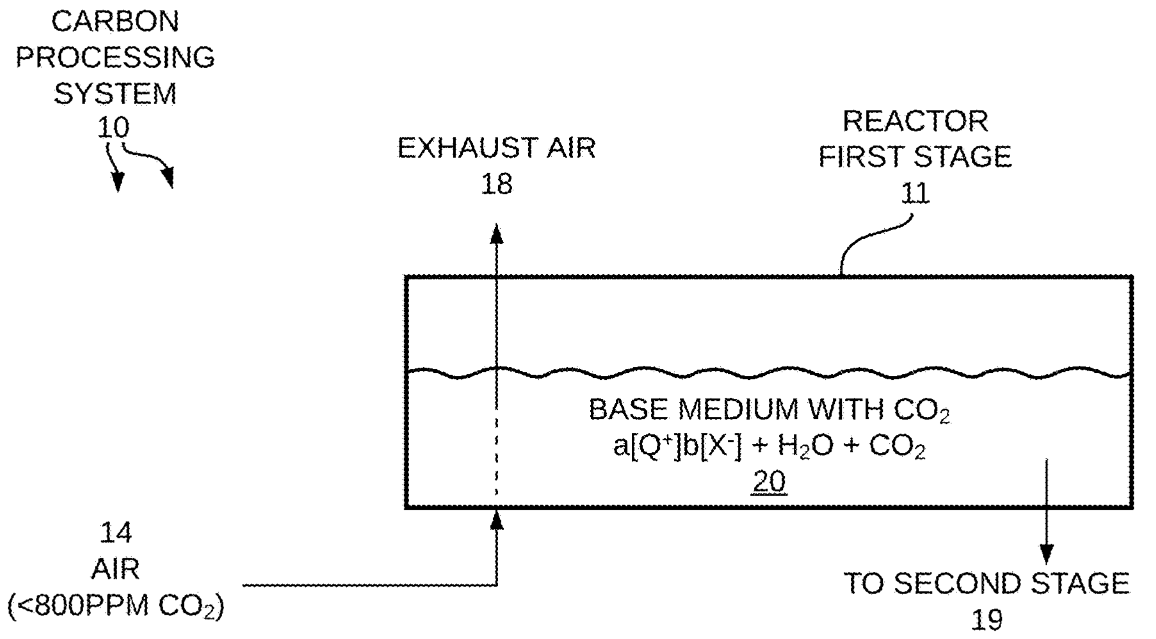
FIG. 2 is a functional diagram of the first stage (absorption stage) of the carbon processing system.

Reference will now be made in detail to some embodiments of the invention, examples of which are illustrated in the accompanying drawings.

FIG. 1 is a diagram of a carbon processing system 10. The carbon processing system 10 comprises air mover 27 and a multi-stage reactor having a first stage 11 and a second stage 19. The first stage 11 comprises distributor 12, packing material 13, collection reservoir 15, and pump 17. The second stage 19 comprises reservoir 21 and makeup system 22. The system 10 also includes a controller 26 that receives inputs from various sensors and provides outputs to valves and other control mechanisms to control the operation and processing of the first 11 and second 19 stages.

In one embodiment, the carbon processing system 10 employs direct air-capture techniques. For example, the carbon processing system 10 uses the air mover 27 to provide air 14 to the system 10 for processing. The air mover 27 comprises at least one of a compressor, a blower, a fan, a turbofan, a pump, a diaphragm pump, an air contactor, a falling-film evaporator, or an absorber. The multi-stage reactor involves a single container or two or more containers that provide the multi-stage functionality. In various embodiments, the air mover 27 is usable to input air into the system and to remove or process air, such as exhaust, from the system.

The multi-stage direct air capture reactor includes a base medium 25. The base medium comprises water, alcohols, glycols, and other polyols containing a dissolved base mixture of $Q^+X^-$. The symbol Q in this general chemical formula is the Quaternary ammonium, and X is the hydroxide and a weak base $M_2^{2+}CO_3^{2-}$. The symbol M in this general chemical formula is the K, Na, Li, $NH_4$, or a quaternary ammonium taken from the group consisting of $N(CH_3)_4$, $N(ethylmethyl)_4$, $N(Butyl)_4$, or their mixtures.

In other embodiments, the base medium 25 includes catalysts or promoters. Sodium, potassium, ammonium, or quaternary ammonium salts of amino acids, such as glycine, proline, arginine, cysteine, asparagine and guanidine, are used as promoters to double, and in some cases, triple the rate of the carbon dioxide absorption reaction in the base medium. A 0.1 to 5% by weight concentration of these promoters are sufficient. However, 30 to 60% of their aqueous solutions themselves are also used as base without the presence of carbonates.

During operation, the air mover 27 moves air 14 having less than 800 PPM of carbon dioxide over the packing material 13. The pump 17 pumps base medium 25 from the collection reservoir 15 up to the distributor 12, which evenly distributes the base medium 25 over the packing material 13. Excess base medium 25 on the packing material 13 flows back into the collection reservoir 15. Thus, the pump 17 continuously circulates base medium 25 from the collection reservoir 15 up to the distributor 12 and over the packing material 13.

As the base medium 25 is distributed over the packing material 13, the airflow 14 across the packing material 13 results in carbon dioxide being removed from the airflow 14. As a result, the carbon dioxide is captured within the base medium 25. The carbon dioxide concentration of the base medium 25 within the collection reservoir 15 begins to increase and the carbon dioxide concentration of the exhaust air 18 decreases.

In one embodiment, a carbon dioxide detector 16 detects the concentration of carbon dioxide within the base medium 25. When the concentration of carbon dioxide reaches a threshold level, the base medium 25 within the collection reservoir 15 is moved to the reservoir 21 of the second stage 19. In one embodiment, additional base medium is then added to the collection reservoir 15.

In the second stage 19, heat 24 is applied to the carbon dioxide-rich base medium 20 to extract the carbon dioxide 23. A catalyst is used to facilitate the desorption process. The output of reservoir 21 flows through a makeup system 22 that regenerates the base medium without carbon dioxide 25, which flows back to the collection reservoir 15. The base medium 25 without carbon dioxide is reusable in processing new air. The extracted carbon dioxide 23 is then output from the second stage 19. The absorption reaction of the first stage 11 and desorption reaction of the second stage 19 are reversible reactions resulting in regeneration of the base medium into its form prior to contacting the air.

The carbon processing system 10 is highly scalable and consumes less processing volume than is required by many conventional carbon processing techniques.

FIG. 2 is a functional diagram of the first stage 11 (absorption stage) of the carbon processing system 10. During operation, air 14 comes in contact with the base medium, which extracts carbon dioxide to form a base medium 20 having a high concentration of carbon dioxide. The exhaust air 18 with reduced carbon dioxide levels is expelled. The base medium 20 having a high concentration of carbon dioxide is moved to the second stage 19 of the reactor.

Figure 3:
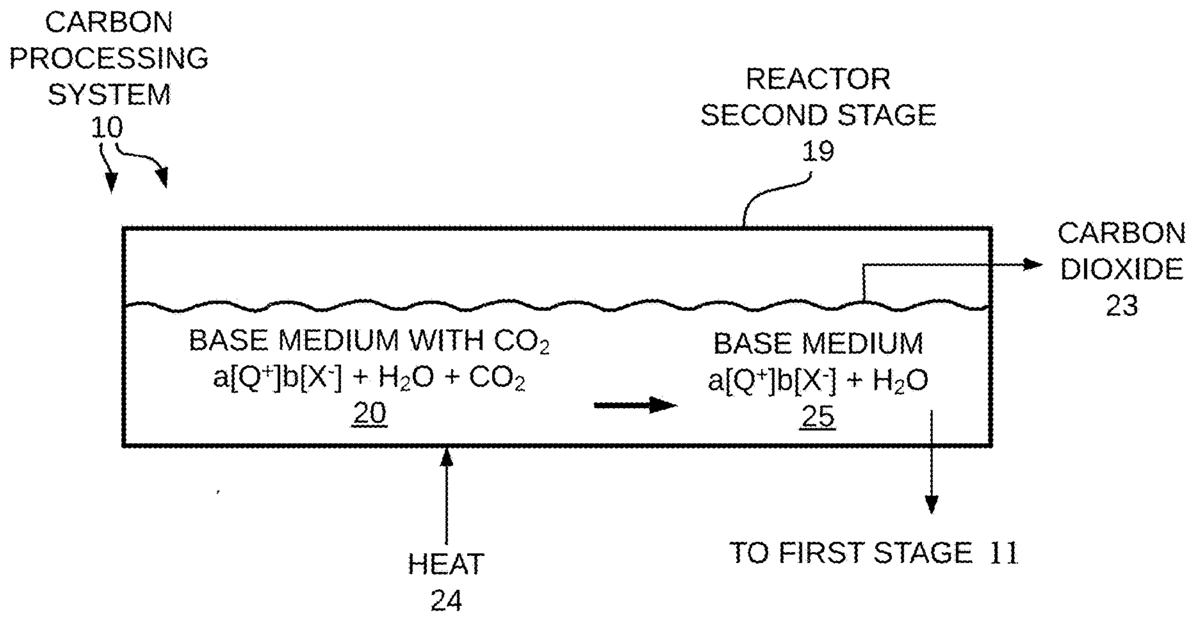
FIG. 3 is a functional diagram of the second stage (desorption stage) of the carbon processing system.

FIG. 3 is a functional diagram of the second stage 19 (desorption stage) of the carbon processing system 10. During operation, heat 24 is applied to the base medium 20 having a high concentration of carbon dioxide to extract carbon dioxide 23. The base medium is returned to its original state 25 without carbon dioxide and returned to the first stage 11.

Figure 4:
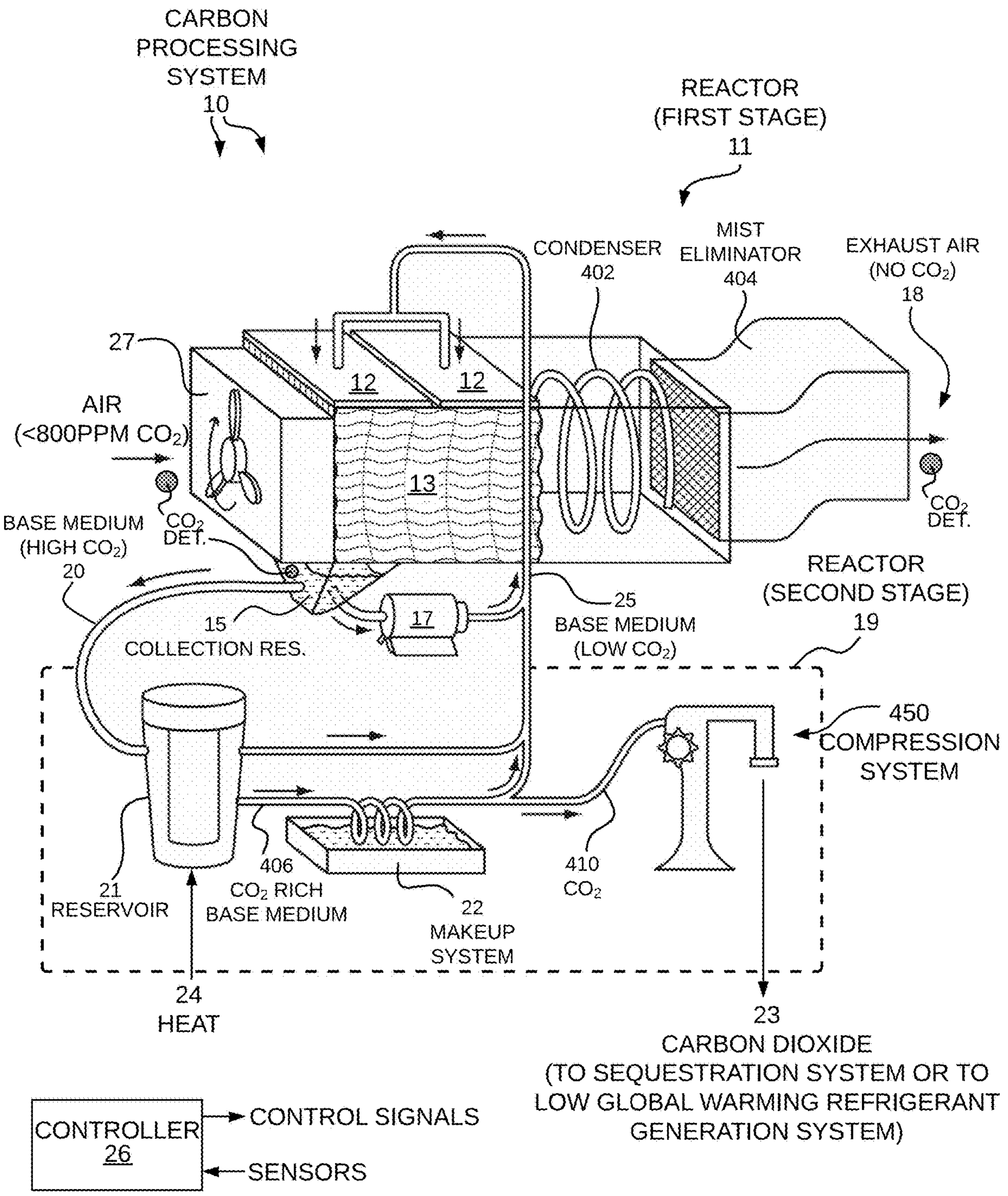
FIG. 4 is a detailed embodiment of the carbon processing system.

FIG. 4 is a detailed embodiment of the carbon processing system 10. FIG. 4 shows the first stage reactor 11 and the second stage reactor 19 of the carbon processing system 10. The first stage reactor 11 comprises fan 27, distributors 12, packing material 13, condenser 402, mist eliminator 404, collection reservoir 15, and pump 17. The second stage reactor 19 comprises reservoir 21 and makeup system 22.

In various embodiments, packing material 13 comprises film fill that is designed to put as much base medium surface area in contact with as much air as possible for as long as possible to eliminate diffusion limit and provide maximum reaction contact time. Film fills allow the base medium to form thin flowing sheets to expose as much base medium surface area as possible to the interacting airflow. A variety of commercially available film fill products are suitable for use with embodiments of the carbon processing system 10.

In various embodiments, the base medium is formed in one or more different configurations and includes one or more catalysts to facilitate carbon dioxide absorption. The controller 26 operates to output control signals that are used to control the various operations of the first 11 and second 19 stages. The controller 26 also receives sensor inputs from various sensors (e.g., carbon dioxide, temperature, etc.) and detectors used to monitor operations of the first 11 and second 19 stages.

During operation, the pump 17 pulls base medium having a low carbon dioxide concentration 25 from the collection reservoir 15 and provides the base medium 25 to the distributors 12, which evenly distributes the base medium 25 over the packing material 13. The fan 27 moves air across the packing material 13 so that carbon dioxide in the air is captured by the base medium 25 flowing over the packing material 13. As the airflow leaves the packing material 13, it moves past the condenser 402 which condenses any medium in the air and returns it to the collection reservoir 15. The mist eliminator 404 eliminates any base medium mist that may still be in the airflow. The exhaust air 18 is released having low or no carbon dioxide.

Once the carbon dioxide concentration of the base medium 25 meets a threshold level, the base medium with high carbon dioxide concentration 20 is moved to the reservoir 21 of the second stage reactor 19. A catalyst is also added to the reservoir 21 to facilitate carbon dioxide absorption. Heat 24 is applied to the reservoir 21 to extract a portion of the base medium with low carbon dioxide concentration 25 and carbon dioxide-rich base medium 406. The makeup system 22 separates carbon dioxide 410 from the base medium 25, which is returned to the first stage reactor 11. The makeup system 22 also makes up for the liquid volume loss by adding liquid medium to the base medium with low carbon dioxide concentration 25. The carbon dioxide 410 extracted from the base medium 25 is then compressed in stages to supercritical carbon dioxide or liquid carbon dioxide 23 in a compression system 450. The carbon dioxide 23 is supplied to a sequestration system, used as a low global warming refrigerant, or output for use in any suitable application.

Figure 5:
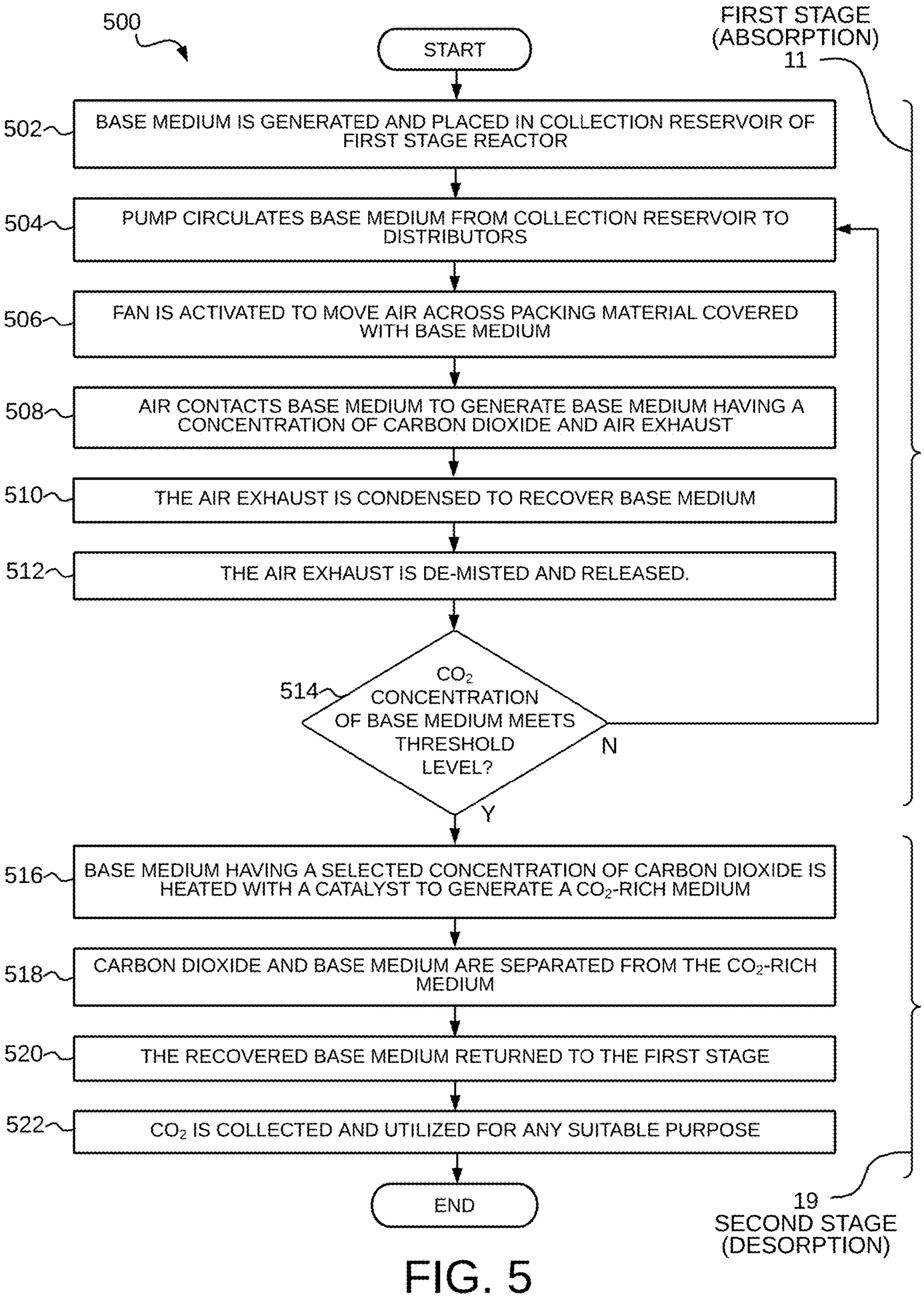
FIG. 5 is a flowchart of a method for processing carbon in accordance with one embodiment of the carbon processing system.

FIG. 5 is a flowchart of a method 500 for processing carbon in accordance with one embodiment of a carbon processing system. The method 500 includes operations performed by a first stage (absorption) 11 and operations performed by a second stage (desorption) 19. In one embodiment, the method 500 is performed by the carbon processing system 10.

At block 502, a base medium is generated and placed into a collection reservoir of a first stage of a carbon processing system. For example, the base medium 25 is generated according to any of the embodiments disclosed herein and placed in the collection reservoir 15 of the first stage reactor 11.

At block 504, a pump circulates the base medium from the collection reservoir to distributors that distribute the base medium over a packing material. For example, pump 17 distributes the base medium 25 up to the distributors 12 that distribute the base medium 25 over the package material 13.

At block 506, an air mover is activated to move air over the packing material. For example, fan 11 moves air having a concentration of carbon dioxide over the packing material 13, which is covered with the base medium 25.

At block 508, air contacts with the base medium to generate a base medium having a concentration of carbon dioxide and to generate air exhaust. For example, the air contacts the base medium 25 on the packing material 13 and carbon dioxide in the air is captured by the base medium 25.

At block 510, air exhaust is condensed to recover the base medium. For example, the air flowing from the packing material 13 flows by the condenser 402 and base medium 20 that is received by the condenser 402 is returned to the collection reservoir 15.

At block 512, the air exhaust is de-misted and released. For example, the air flowing from the condenser 402 is de-misted by the mist eliminator 404. The exhaust air with no or reduced carbon dioxide concentration 18 is released.

At block 514, a determination is made as to whether the carbon dioxide concentration of the base medium meets a threshold level. For example, the controller 26 receives various sensor inputs and determines when the concentration of carbon dioxide in the base medium meets the threshold level. The threshold level can be set to any suitable level. For example, the controller 26 receives carbon dioxide detection levels in the collection reservoir 15, input airflow, and exhaust airflow 18. The controller 26 uses detected carbon dioxide levels to determine when the base medium has a carbon dioxide concentration that meets the threshold level. The controller 26 also receives a variety of sensor inputs, such as temperature sensors, fluid level sensor, and other sensor inputs, and uses these inputs to determine operation of the system and determine when the base medium meets the carbon dioxide concentration threshold level. If the concentration of the base medium does not exceed the threshold level, the method proceeds to block 504. If the carbon dioxide concentration of the base medium exceeds the threshold level, the method proceeds to block 516.

At block 516, the base medium with the concentration of carbon dioxide that exceeds the threshold level is heated with a catalyst to generate a carbon dioxide-rich medium. For example, heat 24 is applied to the reservoir 21 to extract a portion of the base medium with low carbon dioxide concentration 25 and carbon dioxide-rich base medium 406.

At block 518, carbon dioxide and base medium are separated from the carbon dioxide-rich medium. For example, the makeup system 22 separates carbon dioxide 23 and base medium 25 from the carbon dioxide-rich medium 406.

At block 520, the recovered base medium is returned to the first stage. For example, the base medium with low carbon dioxide 25 is returned to the first stage 11.

At block 522, the carbon dioxide is collected and utilized for any suitable purpose. For example, carbon dioxide 23 is collected for further use.

Thus, method 500 operates to provide carbon dioxide processing to remove carbon dioxide from air. It should be noted that the operations of method 500 are exemplary and that the operations can be added to, deleted, rearranged, or otherwise modified within the scope of the embodiments.

Figure 6:
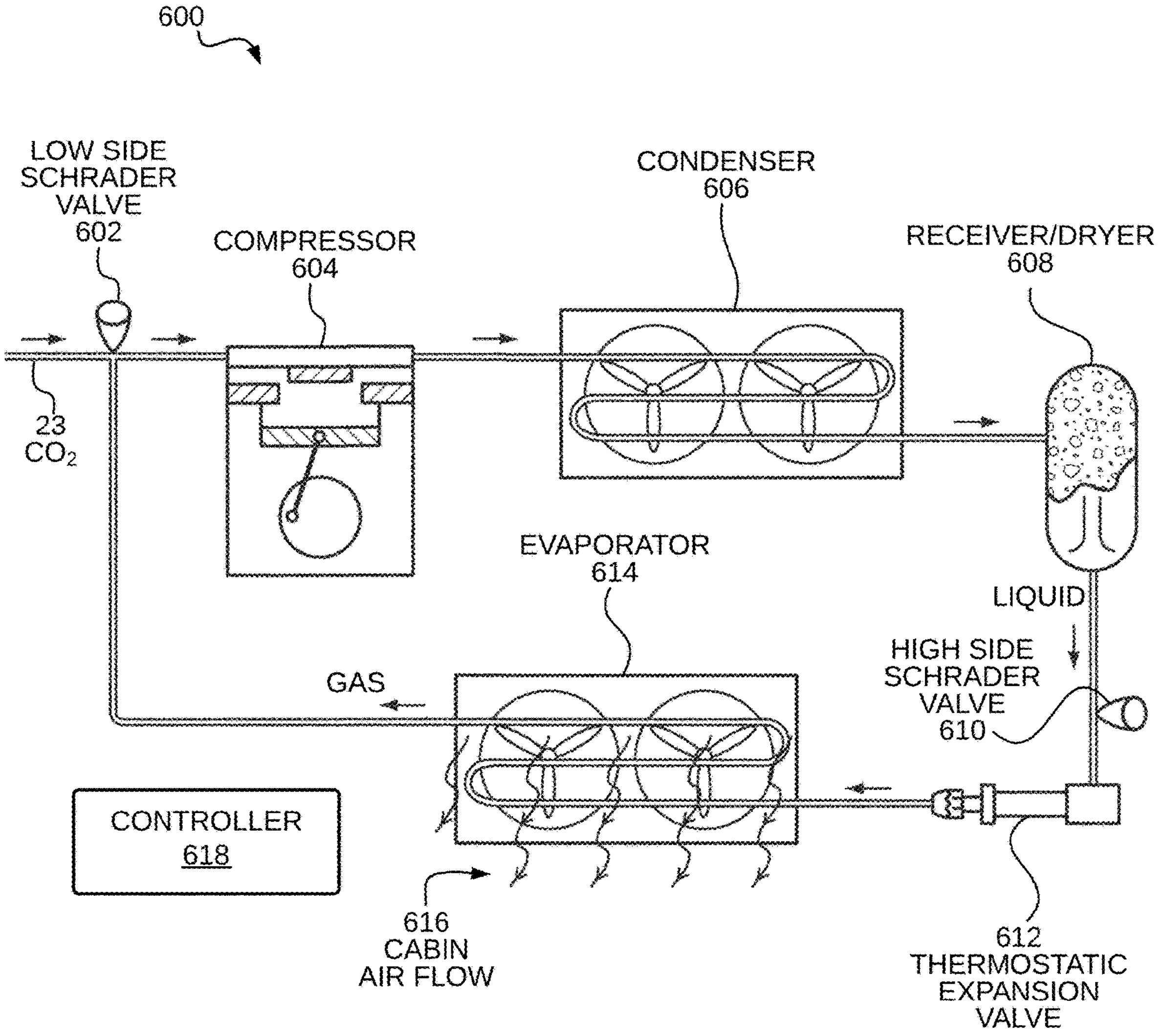
FIG. 6 shows an embodiment of a refrigeration apparatus configured to utilize carbon dioxide generated by embodiments of the carbon processing system.

FIG. 6 shows an embodiment of a refrigeration apparatus 600 configured to utilize carbon dioxide generated by embodiments of the carbon processing system 10 disclosed herein. For example, in one embodiment, apparatus 600 utilizes carbon dioxide output from the compression system 450 as a low global warming refrigerant/coolant to provide cooling in automotive applications. Carbon dioxide used as a refrigerant is natural, non-toxic, non-flammable, abundant, has a high heat transfer coefficient, and has a global warming potential (GWP) of just one (1). As such, it is a more sustainable and efficient coolant option than common refrigerants, such as R22, R152, R404a, and R1234yf refrigerants.

In one embodiment, the refrigeration apparatus 600 is configured for use in automotive applications to utilize carbon dioxide as a coolant to maintain comfortable cabin temperatures economically and sustainably. By using carbon dioxide from direct air capture as provided by embodiments of the carbon processing system 10 disclosed herein, the refrigeration apparatus 600 provides automotive cooling using carbon dioxide as a sustainable and competitive coolant solution.

In one embodiment, the refrigeration apparatus 600 comprises a low side schrader valve 602, compressor 604, condenser 606, receiver/dryer 608, high side schrader valve 610, thermostatic expansion valve 612, and evaporator 614.

In one embodiment, carbon dioxide 23 generated by direct air capture as performed by the carbon processing system 10 is input to the refrigeration apparatus 600. For example, the carbon dioxide 23 is output from the compression system 450. The carbon dioxide 23 is received by the low side schrader valve 602, which allows the carbon dioxide 23 to fill the refrigeration apparatus 600. The valve 602 also serves as a test port in conjunction with the high side schrader valve 610 to ensure that an appropriate pressure differential is maintained within the apparatus 600.

The carbon dioxide flows from the valve 602 to the compressor 604, which pressurizes and heats the carbon dioxide 23. The high-pressure, high-temperature carbon dioxide flows to condenser 606, which cools and liquifies the carbon dioxide. Next, the receiver/dryer 608 removes water from the liquified carbon dioxide.

The high side schrader valve 610 allows the liquid carbon dioxide to flow to the thermostatic expansion valve 612. The high side schrader valve 610 also serves as a test port in conjunction with the low side schrader valve 602 to ensure that the appropriate pressure differential is maintained within the apparatus 600.

The thermostatic expansion valve 612 expands the carbon dioxide and thereby reduces its pressure. The evaporator 614 converts the liquified carbon dioxide back to a gaseous state. As fans in the automotive cabin blow cabin air 616 across the evaporator 614, the carbon dioxide absorbs heat, thereby creating cool, dry air. The carbon dioxide then flows back to the valve 602 to complete the cycle.

Figure 7:
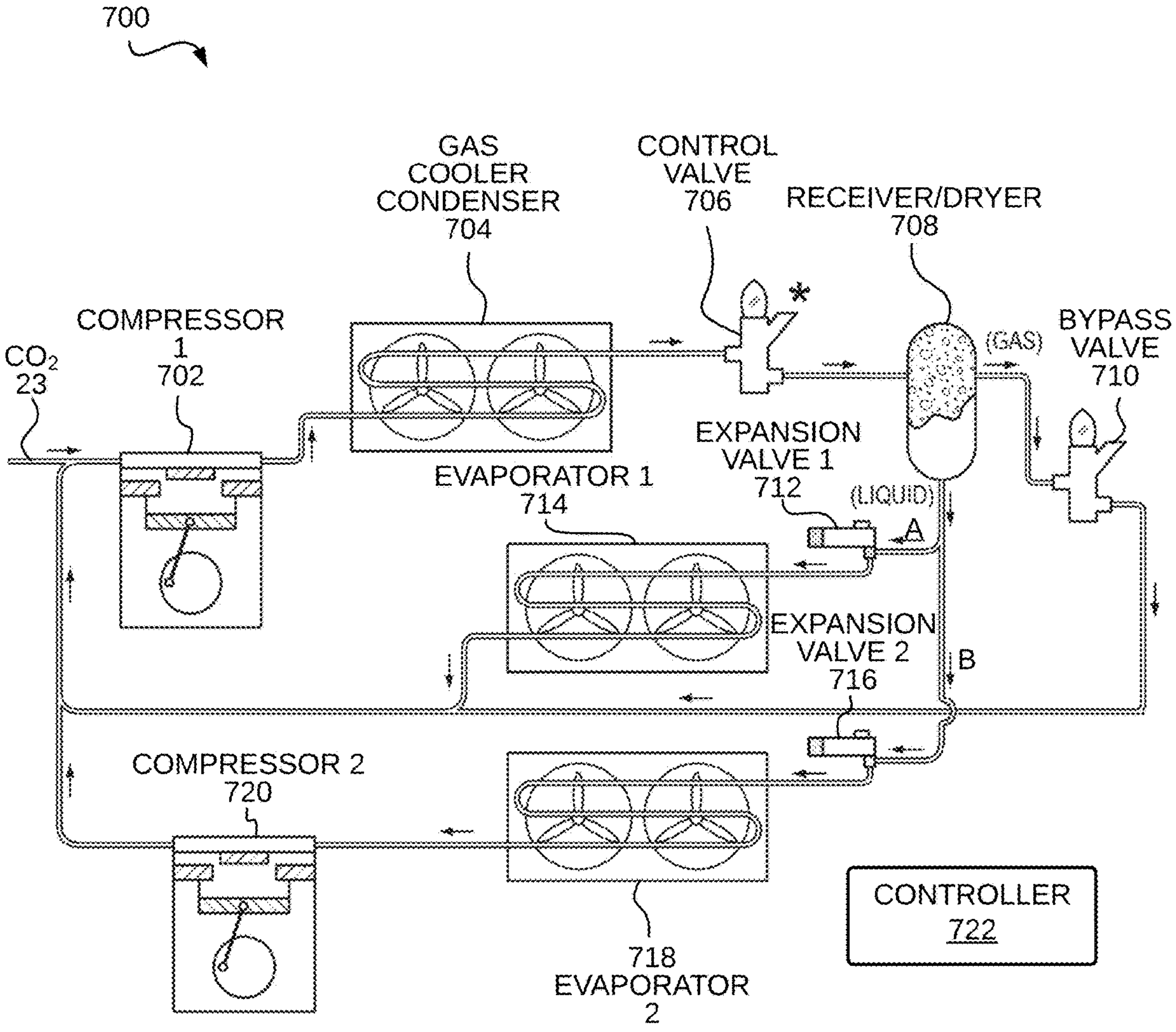
FIG. 7 shows an embodiment of a refrigeration apparatus configured to utilize carbon dioxide generated by embodiments of the carbon processing system.

FIG. 7 shows an embodiment of a refrigeration apparatus 700 configured to utilize carbon dioxide generated by embodiments of the carbon processing system 10 disclosed herein. For example, in one embodiment, apparatus 700 utilizes carbon dioxide output from the compression system 450 as a low global warming refrigerant/coolant to provide cooling in industrial applications. For example, supermarkets and other vendors can use the apparatus 700 to cheaply and sustainably keep perishables at appropriate temperatures.

In one embodiment, the refrigeration apparatus 700 comprises a first compressor 702, condenser 704, control valve 706, receiver/dryer 708, bypass valve 710, first expansion valve 712, first evaporator 714, second expansion valve 716, second evaporator 718, and second compressor 720. The apparatus 700 also comprises a controller 722 that operates to control the operations of the components of the apparatus 700 to provide cooling using carbon dioxide as a refrigerant as described herein.

In one embodiment, carbon dioxide 23 generated by direct air capture as performed by the carbon processing system 10 is input to the refrigeration apparatus 700. For example, the carbon dioxide 23 is output from the compression system 450 and pumped into the apparatus 700. The carbon dioxide 23 is received by the first compressor 702, which compresses the carbon dioxide and sends it to the gas cooler/condenser 704. The condenser 704 cools gaseous carbon dioxide (e.g., supercritical and cannot change phase) and sends the cooled carbon dioxide gas to the control valve 706.

The control valve 706 moderates the pressure of the carbon dioxide gas refrigerant and outputs pressure-moderated gas to the receiver dryer 708. The receiver/dryer 708 receives the pressure-moderated carbon dioxide gas and separates carbon dioxide depending on phase (gas or liquid). Carbon dioxide gas flows from the receiver/dryer 708 to the bypass valve 710. Carbon dioxide liquid flows along line A to the first expansion valve 712 and along line B to the second expansion valve 716.

In one embodiment, the bypass valve 710 provides gaseous carbon dioxide to the input line of the first compressor 702. The first expansion valve 712 allows liquid carbon dioxide to expand before going into the first evaporator 714, which removes unwanted heat and redirects the carbon dioxide to the first compressor 702.

The second expansion valve 716 allows liquid carbon dioxide to expand before going into the second evaporator 718, which removes unwanted heat and redirects the carbon dioxide to the second compressor 720. The second compressor 720 further raises the pressure of carbon dioxide before it is input to the first compressor 702.

In various exemplary embodiments, more efficient versions of the apparatus 700 can be implemented. In one embodiment, the control valve 706 is replaced with a complex Multi-Ejector, and a parallel compressor is added to the first compressor 702. These modifications help to increase overall efficiency, especially in high-temperature environments, by reducing the workload of individual compressors, especially the first compressor 702 that performs the most work.

In the apparatus 700, line A is a medium temperature line (e.g., for use in a refrigerator), and line B is a low temperature line (e.g., for use in a freezer). Therefore, carbon dioxide from line B must undergo additional compression. In a real-world application, there would likely be many more lines, each with specific temperature requirements, and additional compressors as needed.

Figure 8:
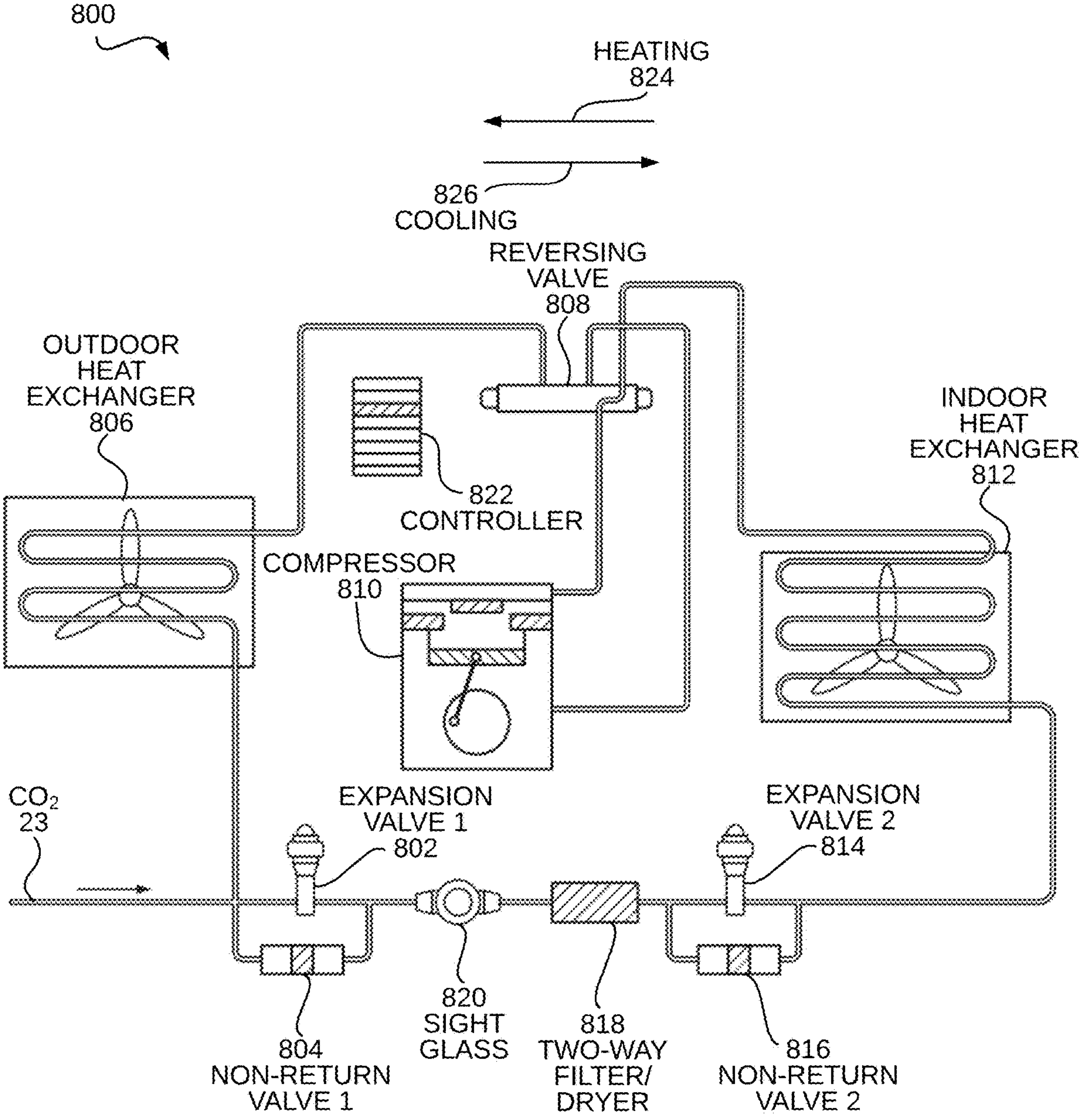
FIG. 8 shows an embodiment of a heat pump apparatus configured to utilize carbon dioxide generated by embodiments of the carbon processing system.

FIG. 8 shows an embodiment of a heat pump apparatus 800 configured to utilize carbon dioxide generated by embodiments of the carbon processing system 10 disclosed herein. For example, in one embodiment, apparatus 800 utilizes carbon dioxide output from the compression system 450 as a low global warming refrigerant/coolant to provide heat pump operations (e.g., heating and cooling) in industrial applications.

In one embodiment, the heat pump apparatus 800 comprises a first expansion valve 802, a first non-return valve 804, an outdoor heat exchanger 806, a reversing valve 808, a compressor 810, an indoor heat exchanger 812, a second expansion valve 814, a second non-return valve 816, a two-way filter/dryer 818, and a sight glass 820. The apparatus 800 also comprises a controller 822 that operates to control the operations of the components of the apparatus 800 to provide heating and cooling using carbon dioxide as a low global warming refrigerant as described herein.

In one embodiment, carbon dioxide 23 generated by direct air capture as performed by the carbon processing system 10 is input to the heat pump apparatus 800. For example, carbon dioxide 23 is output from the compression system 450 and pumped into the apparatus 800.

The apparatus 800 operates in a cooling mode in which the carbon dioxide flows generally clockwise around the apparatus 800 as indicated by cooling flow indicator 826. The apparatus 800 operates in a heating mode in which the carbon dioxide flows generally counter-clockwise around the apparatus 800 as indicated by heating flow indicator 824.

During operation, carbon dioxide 23 is received by the first expansion valve 802 that allows the carbon dioxide to reduce pressure and temperature during the cooling mode. The first non-return valve 804 allows flow during the heating mode. The sight glass 820 allows for visual inspection. The two-way filter/dryer 818 removes water and other particulates from the carbon dioxide flow. The second expansion valve 814 allows the carbon dioxide to reduce pressure and temperature during the heating mode. The second non-return valve 816 allows carbon dioxide flow during the cooling mode.

The indoor heat exchanger 812 transfers heat between the carbon dioxide and the indoor air. The reversing valve 808 controls the direction of the carbon dioxide flow, which changes from between heating and cooling. The compressor 810 compresses the carbon dioxide as required. The outdoor heat exchanger transfers heat between the carbon dioxide and the outdoor air.

The controller 822 takes data from sensors throughout the system to monitor and control the designated heating or cooling modes.

Figure 9:
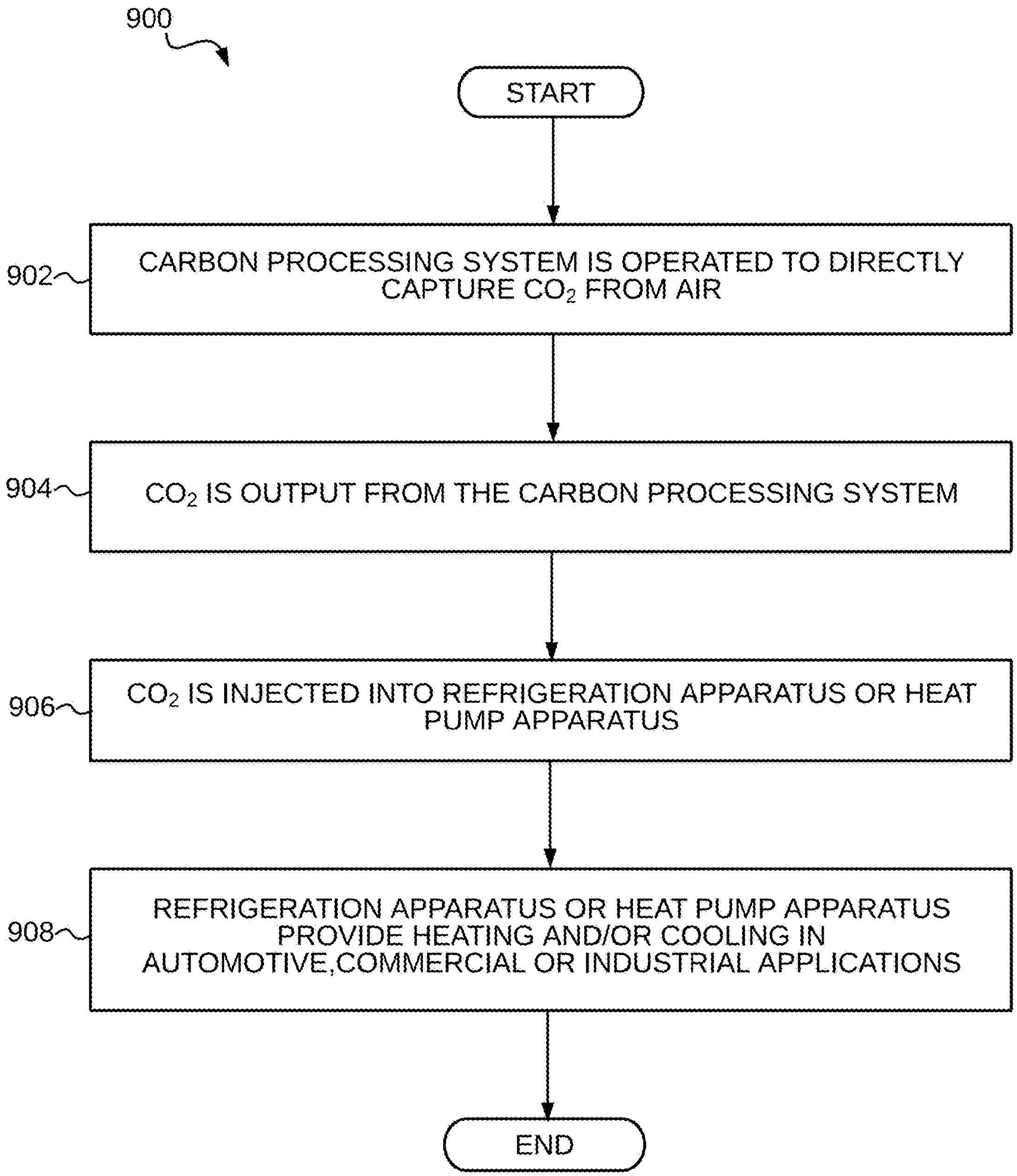
FIG. 9 is a flowchart of a method for utilizing carbon dioxide generated by embodiments of the carbon processing system to provide heating and cooling.

FIG. 9 is a flowchart of a method 900 for utilizing carbon dioxide generated by the carbon processing system 10 to provide heating and cooling in automotive, commercial, and industrial applications.

At block 902, a carbon processing system is operated to directly capture carbon dioxide from air. For example, the carbon processing system 10 is operated using a base medium disclosed in any of the embodiments to directly capture carbon dioxide from air.

At block 904, the captured carbon dioxide is output from the carbon processing system. For example, the captured carbon dioxide is output from the compression system 450 of the carbon processing system 10.

At block 906, the captured carbon dioxide is injected into a refrigeration apparatus or a heat pump apparatus. For example, the captured carbon dioxide 23 is injected into the refrigeration apparatus 600, the refrigeration apparatus 700, or the heat pump apparatus 800.

At block 908, the apparatus receiving the direct-captured carbon dioxide is operated to provide heating or cooling in automotive, commercial, or industrial applications.

Thus, method 900 operates to utilize carbon dioxide generated by the carbon processing system 10 to provide heating and cooling in automotive, commercial, and industrial applications. It should be noted that the operations of method 900 are exemplary and not limiting and can be added to, deleted, rearranged, or otherwise modified within the scope of the embodiments.

Various embodiments for generating base medium and catalysts for use by the novel carbon processing system are discussed below. It is appreciated that minor changes or adjustments exist within the scope of the embodiments related to the chemistry used in the direct air capture device.

Embodiment #1

In a first embodiment, the base medium comprises one kg-mole of $M_2^{2+}CO_3^{2-}$ (where M is $Na^+$, $K^+$, $Li^+$, $NH_4^+$, or quaternary ammonium$^+$) base mixed with water to make an aqueous solution with a concentration anywhere between 1%-100% by weight. More specifically, the concentration is between 20-80% by weight or between 20-40% by weight. A 0.1-5 wt % of a catalyst comprising an amino acid or more preferably amino acid salt of arginine, asparagine, cysteine, glycine, proline, or guanidine is added into the solution.

One kg-mole of pure carbon dioxide (99.9% purity) is brought into contact with the aqueous solution in an autoclave under stirring at a temperature between 5° C.-110° C. More specifically, the temperature is between 10° C.-60° C. or between 40-70° C. When most of the carbon dioxide is absorbed by the solution, the overhead pressure of the autoclave is released. A 0.1-5-wt % of a freshly prepared catalyst of the general formula M-O—$(OH)_n$ is added where "M" is Cr, V, Ti and/or Mo and "n" is an integer between one (1) and six (6).

A steam-jacketed desorber is then heated to between 50-150° C. More specifically, the desorber is heated between 60-130° C. or between 70-125° C. to desorb carbon dioxide. The overhead pure carbon dioxide is bottled for injection. The conversion and selectivity in the absorption step is 100% and 100% and the conversion and selectivity in the desorption step is around 90-100% and 99.99%, respectively.

Embodiment #2

In a second embodiment, the base medium comprises $M^{2+}CO_3^{2-}$, where M is Na, K, Li, $NH_4$, or quaternary ammonium. The base medium is mixed with water to make an aqueous solution with a concentration anywhere between 1%-100% by weight. More specifically, the concentration is between 20-80% by weight or between 20-40% by weight. A 0.1-5 wt % of a catalyst comprising an amino acid of glycine, proline, arginine, cysteine, asparagine, guanidine, or their carboxylate salts is added into the solution.

One kg-mole equivalent of carbon dioxide from an air stream with 400 ppm of carbon dioxide concentration is brought in contact with the aqueous solution over a period of time in a continuous flow reactor at a temperature between 5° C.-110° C. More specifically, the temperature is between 10° C.-60° C. or between 15-50° C. When most of the carbon dioxide is absorbed by the solution, the overhead pressure is released. A 0.1-5 wt % of a freshly prepared catalyst of the general formula M-O—$(OH)_n$ is added where "M" is Cr, V, Ti, and/or Mo and "n" is an integer between one (1) and six (6).

A steam-jacketed desorber is then heated to between 50-150° C. More specifically, the desorber is heated between 60-130° C. or between 70-125° C. to desorb carbon dioxide. The overhead pure carbon dioxide is bottled for injection. The conversion and selectivity in the absorption step is 30-70% and 99%, and the conversion and selectivity in the desorption step is around 70-100% and 99% respectively.

Embodiment #3

In a third embodiment, the base medium comprises one kg-mole of $M^{2+}CO_3^{2-}$, where M is Na, K, Li, $NH_4$, or quaternary ammonium. The base medium is mixed with water to make an aqueous solution with a concentration anywhere between 1%-100% by weight. More specifically, the concentration is between 20-80% by weight or between 20-40% by weight. A 0.1-5 wt % of a catalyst comprising an amino acid or their sodium, potassium, or ammonium salt of glycine, proline, cysteine, arginine, asparagine, guanidine, and melamine is added into the solution.

One and a half (1.5) Kg-mole equivalent of carbon dioxide in flue gas stream with 10-35% by weight carbon dioxide concentration is brought in contact with the aqueous solution over time in a continuous flow reactor at a temperature between 5° C.-110° C. More specifically, the temperature is between 10° C.-60° C. or between 40-70° C. When most of the carbon dioxide is absorbed by the solution, the overhead pressure is released. A 0.1-5 wt % of a freshly prepared catalyst of the general formula M-O—$(OH)_n$ is added where "M" is Cr, V, Ti and/or Mo and "n" is an integer between one (1) and six (6).

A steam-jacketed desorber is then heated to between 50-150° C. More specifically, the desorber is heated between 60-130° C. or between 70-125° C. to desorb carbon dioxide. The overhead pure carbon dioxide is bottled for injection. The conversion and selectivity in the absorption step is 30-70% and 99%, and the conversion and selectivity in the desorption step is around 70-100% and 99% respectively.

Embodiment #4

In a fourth embodiment, the configuration is the same as in Embodiment #2, but instead of using an air-liquid contactor, a bubble column reactor is used to achieve 85-90% conversion and 99% selectivity.

Embodiment #5

In a fifth embodiment, the configuration is the same as in Embodiment #2, except that a 50%-50% by weight mixture of water and glycol is used as the solvent instead of 100% water. Conversion and selectivity to carbon dioxide is similar to Embodiment #2. However, the water loss is minimized to 1-3% instead of the usual 5-7%.

Embodiment #6

In a sixth embodiment, the configuration is the same as in Embodiment #2, except that a 50%-50% by weight mixture of water and alcohol is used as the solvent instead of 100% water. Conversion and selectivity to carbon dioxide is similar to Embodiment #2.

Embodiment #7

In a seventh embodiment, the configuration is the same as in Embodiment #2, except that a 50%-50% by weight mixture of water and PGMEA is used as the solvent instead of 100% water. Conversion and selectivity to carbon dioxide is similar to Embodiment #2, but water loss is limited to 3%.

Embodiment #8

In an eighth embodiment, the base medium comprises one kg-mole of $Q^+X^-$, where "Q" is tetramethyl quaternary ammonium, tetraethyl quaternary ammonium, ethyl trimethyl quaternary ammonium, tetrabutyl quaternary ammonium, methyltribuyl quaternary ammonium, or methylethyldibutyl quaternary ammonium cation, and "X" is $OH^-$. Base medium is mixed with water to make an aqueous solution with a concentration anywhere between 1%-100% by weight. More specifically, the concentration is between 20-80% by wt or between 20-40% by weight. A 0.1-5 wt % of a catalyst comprising an amino acid salt, such as glycine, is added into the solution.

One Kg-mole of carbon dioxide equivalent in an air stream with 400 ppm of carbon dioxide concentration is brought in contact with the aqueous solution over time in a continuous flow reactor at a temperature between 5° C.-110° C. More specifically, between 10° C.-60° C. or between 40-50° C. When most of the carbon dioxide is absorbed by the solution, the overhead pressure is released. A 0.1-5 wt % of a freshly prepared catalyst of the general formula M-O—$(OH)_n$ is added where "M" is Cr, V, Ti, and/or Mo and "n" is an integer between one (1) and six (6).

A steam-jacketed desorber is then heated to between 50-150° C. More specifically, the desorber is heated between 60-130° C. or between 70-120° C. to desorb carbon dioxide. The overhead pure carbon dioxide is bottled for injection. The conversion and selectivity in the absorption step is 50-90% and 99%, and the conversion and selectivity in the desorption step is around 70-90% and 99% respectively.

Embodiment #9

In a ninth embodiment, the base medium comprises one kg-mole of $Q^+X^-$, where "Q" is tetramethyl quaternary ammonium, tetraethyl quaternary ammonium, ethyl trimethyl quaternary ammonium, tetrabutyl quaternary ammonium, methyltribuyl quaternary ammonium, or methylethyldibuyl quaternary ammonium cation and "X" is $OH^-$. The base medium is mixed with water and glycerol to make an aqueous solution with a concentration anywhere between 1%-100% by weight. More specifically, the concentration is between 20-80% by weight or between 20-40% by weight. A 0.1-5 wt % of a catalyst comprising an amino acid salt, such as glycine, proline, or guanidine, is added into the solution.

1.1 Kg-mole of carbon dioxide equivalent in a flue gas stream with 5-35-wt % carbon dioxide concentration is brought in contact with the aqueous solution over time in a continuous flow reactor at a temperature between 5° C.-110° C. More specifically, the temperature is between 10° C.-60° C. or between 50-75° C. When most of the carbon dioxide is absorbed by the solution, the overhead pressure is released. A 0.1-5 wt % of a freshly prepared catalyst of the general formula M-O—$(OH)_n$ is added where "M" is Cr, V, Ti, and/or Mo and "n" is an integer between one (1) and six (6).

A steam-jacketed desorber is then heated to between 50-150° C. More specifically, the desorber is heated between 60-130° C. or between 70-130° C. to desorb carbon dioxide. The overhead pure carbon dioxide is bottled for injection. The conversion and selectivity in the absorption step is 80-100% and 99%, and the conversion and selectivity in the desorption step is around 90-100% and 99.9% respectively.

Embodiment #10

In a tenth embodiment, the configuration is the same as in Embodiment #8, but instead of an air-liquid contactor, a bubble column reactor is used to achieve 85-90% conversion and 99% selectivity.

Embodiment #11

In an eleventh embodiment, the configuration is the same as in Embodiment #8, except that a 50%-50% by weight mixture of water and glycol is used as the solvent instead of 100% water. Conversion and selectivity to carbon dioxide is similar to Embodiment #2. However, the water loss is minimized to 1-3% instead of the usual 5-7%.

Embodiment #12

In a twelfth embodiment, the configuration is the same as in Embodiment #8, except that a 50%-50% by weight mixture of water and alcohol is used as the solvent instead of 100% water. Conversion and selectivity to carbon dioxide is similar to Embodiment #2.

Embodiment #13

In a thirteenth embodiment, the configuration is the same as in Embodiment #8, except that a 50%-50% by weight mixture of water and PGMEA is used as the solvent instead of 100% water. Conversion and selectivity to carbon dioxide is similar to Embodiment #2, but water loss is limited to 3%.

Embodiment #14

In a fourteenth embodiment, the base medium comprises one kg-mole of $M_2^{2+}CO_3^{2-}$ where "M" is $Na^+$, $K^+$, $Li^+$, $NH_4^+$, or quaternary ammonium$^+$. The base medium, 0.1-1 wt % of glycine, and 0.1-1 wt % of tetrabutylammonium hydroxide are mixed with a water-Glycerol solvent mixture to make an aqueous solution with a concentration anywhere between 1%-100% by weight. More specifically, the concentration is between 20-80% by weight or between 20-40% by weight.

One Kg-mole of carbon dioxide in an air stream with 400 ppm of carbon dioxide concentration is brought in contact with the aqueous solution over time in a continuous flow reactor at a temperature between 5° C.-110° C. More specifically, the temperature is between 10-75° C. or between 50-70° C. When most of the carbon dioxide is absorbed by the solution, the overhead pressure is released. A 0.1-5 wt % of a freshly prepared catalyst of the general formula M-O—$(OH)_n$ is added where "M" is Cr, V, Ti, and/or Mo and "n" is an integer between one (1) and six (6).

A steam-jacketed desorber is then heated to between 50-150° C. More specifically, the desorber is heated between 60-130° C. or between 70-120° C. to desorb carbon dioxide. The overhead pure carbon dioxide is bottled for injection. The conversion and selectivity in the absorption step is 30-70% and 99%, and the conversion and selectivity in the desorption step is around 70-100% and 99% respectively.

Embodiment #15

In a fifthteenth embodiment, the base medium comprises one kg-mole of $Q^+X^-$, where $Q^+$ is tetramethyl quaternary ammonium cation, tetraethyl quaternary ammonium cation, ethyl trimethyl quaternary ammonium cation, tetrabutyl quaternary ammonium cation, methyl tributyl quaternary ammonium cation, methylethyldibuyl quaternary ammonium cation, or ammonium cation and $X^-$ is hydroxide anion as the base, 0.1-1 wt % of Arginine, and 0.1-1 wt % of KOH mixed with water-Glycerol solvent mixture to make an aqueous solution with a concentration anywhere between 1%-100% by weight. More specifically, the concentration is between 20-80% by weight or between 20-40% by weight.

One Kg-mole of carbon dioxide in an air stream with 400 ppm of carbon dioxide concentration is brought in contact with the aqueous solution over time in a continuous flow reactor at a temperature between 5-110° C. More specifically, the temperature is between 10-75° C. or between 50-70° C. When most of the carbon dioxide is absorbed by the solution, the overhead pressure is released. A 0.1-2 wt % of a freshly prepared catalyst of the general formula M-O—$(OH)_n$ is added where "M" is Cr, V, Ti and/or Mo and "n" is an integer between one (1) and six (6).

A steam-jacketed desorber is then heated to between 50-150° C. More specifically, the desorber is heated to between 60-130° C. or between 70-120° C. to desorb carbon dioxide. The overhead pure carbon dioxide is bottled for injection. The conversion and selectivity in the absorption step is 30-70% and 99%, and the conversion and selectivity in the desorption step is around 70-100% and 99% respectively.

Embodiment #16

In a sixteenth embodiment, the base medium comprises one kg-mole of sodium, potassium, and ammonium salts or free forms of Glycine, Proline, Arginine, Cysteine, Asparagine, Guanidine, or their mixture in water or water-Glycerol solvent mixture to make an aqueous solution with a concentration anywhere between 18-100% by weight. More specifically, the concentration is between 20-80% by weight or between 20-40% by weight.

One Kg-mole equivalent of carbon dioxide in an air stream with 400 ppm of carbon dioxide concentration is brought in contact with the aqueous solution over time in a continuous flow reactor at a temperature between 5-110° C. More specifically, the temperature is between 10-75° C. or between 50-70° C. When most of the carbon dioxide is absorbed by the solution, the overhead pressure is released. A 0.1-2 wt % of a freshly prepared catalyst of the general formula M-O—$(OH)_n$ is added where "M" is Cr, V, Ti, and/or Mo and "n" is an integer between one (1) and six (6).

A steam-jacketed desorber is then heated to between 50-150° C. More specifically, the desorber is heated to between 60-150° C. or between 70-135° C. to desorb carbon dioxide. The overhead pure carbon dioxide is bottled for injection. The conversion and selectivity in the absorption step is 60-70% and 99%, and the conversion and selectivity in the desorption step is around 90-100% and 99% respectively.

Embodiment #17

In a seventeenth embodiment, high surface area solid materials such as Zeolites, Molecular Sieves, and MOFs that are stable under humid conditions are soaked in an aqueous base solution containing any one of potassium or sodium carbonate, tetrabutylammonium hydroxide, or salts of amino acids like glycine, proline, and guanidine, dried and preconditioned. The base-impregnated solid surfaces are exposed to air in a continuous flow reactor to capture carbon dioxide, which after adsorption, are desorbed by a temperature swing process to get pure carbon dioxide gas as a product.

Embodiment #18

In an eighteenth embodiment, the base medium comprises a mixture of a phase transfer agent including but not limited to 100 ppm to 100 wt % ethyl-methyl-dibutyl ammonium hydroxide, a weaker base such as $K_2CO_3$ or $Na_2CO_3$ with 10-80 wt %, 0.01-10 wt % potassium or sodium salts of amino acids such as glycine, asparagine, Arginine mixed with water, and a high boiling poly-ol to make an aqueous solution with a concentration anywhere between 1%-100% by weight. More specifically, the concentration is between 20-80% by weight or 20-40% by weight.

The carbon processing system 10 passes air over the solution to saturate the solution with carbon dioxide at 4° C.-70° C. A 0.1-5-wt % of a freshly prepared catalyst of the general formula M-O—$(OH)_n$ is added to the carbon dioxide saturated solution where "M" is Cr, V, Ti, and/or Mo and "n" is an integer between one (1) and six (6).

A steam-jacketed desorber is then heated to between 50° C. and 150° C. More specifically, the desorber is heated to between 60-140° C. or between 70-135° C. to desorb carbon dioxide. The overhead pure carbon dioxide is compressed and bottled. The conversion and selectivity in the absorption step is 73% and 98%, and the conversion and selectivity in the desorption step is around 94-100% and 99.99%, respectively.

Embodiment #19

In a nineteenth embodiment, the base medium comprises one kg-mole of $Q^+X^-$, where cation Q is tetramethyl quaternary ammonium, tetraethyl quaternary ammonium, ethyl trimethyl quaternary ammonium, tetrabutyl quaternary ammonium, methyltributyl quaternary ammonium, or methylethyldibutyl quaternary ammonium, and anion X is hydroxide. The base medium is mixed with water to make an aqueous solution with a concentration anywhere between 10%-100% by weight. More specifically, the concentration is between 20-80% by weight or between 20-40% by weight. A 0.1-5 wt % of a catalyst comprising an amino acid salt(s) of any one or mixture of glycine, proline, arginine, cysteine, asparagine, and guanidine is added into the solution.

The carbon processing system 10 blows an air stream with 400-700 ppm of carbon dioxide concentration in contact with the aqueous solution over time in a continuous flow reactor at a temperature between 5-110° C. More specifically, the temperature is between 10-60° C. or between 40-50° C. When most of the carbon dioxide is absorbed by the solution, the carbon dioxide rich solution is pumped into a desorption reactor. A 0.1-5 wt % of a freshly prepared catalyst of the general formula M-O—$(OH)_n$ is added where "M" is Cr, V, Ti, and/or Mo and "n" is an integer between one (1) and six (6).

A steam-jacketed desorber is then heated to between 50-150° C. More specifically, the desorber is heated to between 60-150° C. or between 90-135° C. to desorb carbon dioxide. The overhead pure carbon dioxide is bottled for injection. The conversion and selectivity in the absorption step is 52-93% and 99%, and the conversion and selectivity in the desorption step is around 70-98% and 99%, respectively.

Embodiment #20

In a twentieth embodiment, the base medium comprising a 10-60-wt % solution of amino acid or its sodium or potassium salts are used as the carbon dioxide absorbing chemistry with 100-500 ppm of a phase transfer agent of $Q^+X^-$, where "Q" is tetramethyl quaternary ammonium, tetraethyl quaternary ammonium, ethyl trimethyl quaternary ammonium, tetrabutyl quaternary ammonium, methyltributyl quaternary ammonium, or methylethyldibuyl quaternary ammonium cation and "X" is $OH^-$. A water and glycerol mixture is used as a solvent to make an aqueous solution with a concentration anywhere between 18-100% by weight. More specifically, the concentration is between 20-80% by weight or between 20-60% by weight. Then added to the base medium is 0.01-20 wt % of a catalyst comprising a free amino acid or its sodium or potassium salts of sarcosine, glycine, proline, guanidine, cysteine, arginine, or asparagine.

After the carbon processing system 10 achieves full absorption of carbon dioxide in the chemistry, the carbon dioxide-rich solution is pumped into a high-pressure desorber. A 0.1-5 wt % of a freshly prepared catalyst of the general formula M-O—$(OH)_n$ is added where "M" is Cr, V, Ti, and/or Mo and "n" is an integer between one (1) and six (6).

A steam-jacketed desorber is then heated to between 50-150° C. More specifically, the desorber is heated to between 60-130° C. or between 70-130° C. to desorb carbon dioxide. The overhead pure carbon dioxide is bottled for injection. The conversion and selectivity in the absorption step is 55-85% and 99%, and the conversion and selectivity in the desorption step is around 95-100% and 99.9%, respectively.

Embodiment #21

In a twenty-first embodiment, the same base medium is used as in Embodiment #20, but instead of using an air-liquid contactor, a bubble column reactor is used to achieve 85-90% conversion and 99% selectivity.

Embodiment #22

In a twenty-second embodiment, Embodiment #20 is run with a 50%-50% by weight mixture of water and glycol as the solvent instead of 100% water. Conversion and selectivity to carbon dioxide is similar to embodiment #19; however, the water loss is minimized to 1-3% instead of the usual 5-7%.

Embodiment #23

In a twenty-third embodiment, Embodiment #20 is modified to run with 50%-50% by weight mixture of water and alcohol as the solvent instead of 100% water. Conversion and selectivity to carbon dioxide is similar to Embodiment #19.

Embodiment #24

In a twenty-fourth embodiment, Embodiment #20 is modified to run with 50%-50% by weight mixture of water and PGMEA as the solvent instead of 100% water. Conversion and selectivity to carbon dioxide is similar to Embodiment #19, but water loss is limited to 3%.

Embodiment #25

In a twenty-fifth embodiment, high surface area solid materials, such as zeolites, molecular sieves, and MOFs that are stable under humid conditions, are soaked in an aqueous base solution containing any one of potassium or sodium carbonate, tetrabutylammonium hydroxide, or salts of amino acids like glycine, proline, guanidine, cysteine, arginine, and asparagine, dried and preconditioned. The base-impregnated solid surfaces on filter papers are exposed to air in a continuous flow reactor to capture carbon dioxide, which after adsorption, is desorbed by a temperature swing process with or without vacuum to get pure carbon dioxide gas as a product.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A system comprising:

a compression system coupled to receive captured carbon dioxide gas from a direct air capture system and configured to compress the captured carbon dioxide gas, wherein the direct air capture system captures carbon dioxide via gas/liquid contact; and a refrigeration apparatus fluidically coupled to the compression system, the refrigeration apparatus comprising an input coupled to receive the compressed carbon dioxide from the compression system, wherein the refrigeration apparatus is configured to use the compressed carbon dioxide to provide cooling and heating.

2. The apparatus of claim 1, wherein a base mixture for the direct air capture system comprises:

a or mixtures of phase transfer catalysts, wherein the phase transfer catalysts have a radical cation and a radical anion, wherein the radical cation includes a quaternary ammonium cation ($NR_4^+$) wherein, the radical anion includes at least one of a Hydroxide anion ($OH^-$) a fluoride anion ($F^-$), an Iodide anion ($I^-$), a Carbonate anion ($CO_3^{2-}$), or a Bicarbonate anion ($HCO_3^-$).

3. The apparatus of claim 1, wherein a base mixture for the direct air capture system comprises one or more of the following:

a free amino acid, or a sodium, potassium, ammonium, or quaternary ammonium salt of amino acid.

4. The apparatus of claim 1, wherein a base mixture for the direct air capture system comprises:

a base with common structure of $Q^+X^-$, where $Q^+$ is a cation of one or more of potassium, ammonium, sodium, calcium, vanadium, titanium, lithium, boron, or quaternary ammonium, and $X^-$ is an anion of one or more of hydroxide, carbonate, bicarbonates, borates, or titanates.

5. The apparatus of claim 1, wherein a base mixture for the direct air capture system comprises one or more of the following:

a free amine, or a salt of any primary, secondary and quaternary amine.

6. The apparatus of claim 1, wherein a base mixture for the direct air capture system comprises:

a solvent system comprising water or a mixture of water/glycerol, water/glycols, water/polyols, water/alcohols to capture carbon dioxide from air with purity between 71% and 100%.

7. A method comprising:

receiving, at a compression system, carbon dioxide from a direct air capture system configured to capture the carbon dioxide via gas/liquid contact;

compressing, by operation of the compression system, the carbon dioxide;

injecting the compressed carbon dioxide from the compression system into a refrigeration apparatus; and operating the refrigeration apparatus using the compressed carbon dioxide as a fluid to provide cooling and heating.

8. The method of claim 7, wherein a base mixture for the direct air capture system comprises:

a-phase transfer catalyst, wherein the phase transfer catalyst comprises a radical cation and a radical anion, the radical cation comprises-a quaternary ammonium cation ($NR_4^+$), and the radical anion comprises at least one of a Hydroxide anion ($OH^-$), a fluoride anion ($F^-$), an Iodide anion ($I^-$), a Carbonate anion ($CO_3^{2-}$), or a Bicarbonate anion ($HCO_3^-$).

9. The method of claim 7, wherein a base mixture for the direct air capture system comprises one or more of the following:

a free amino acid, or a sodium, potassium, ammonium, or quaternary ammonium salt of amino acid.

10. The method of claim 7, wherein a base mixture for the direct air capture system comprises:

a or mixtures of a base with common structure of $Q^+X^-$, where $Q^+$ is a cation of potassium, ammonium, sodium, calcium, vanadium, titanium, lithium, boron, or quaternary ammonium, and $X^-$ is an anion of hydroxide, carbonate, bicarbonates, borates, and titanates.

11. The method of claim 7, wherein a base mixture for the direct air capture system comprises one or more of the following:

a free amine, or a salt of any primary, secondary and quaternary amine.

12. The method of claim 7, wherein a base mixture for the direct air capture system comprises:

a solvent system comprising water or a mixture of water/glycerol, water/glycols, water/polyols, water/alcohols to capture carbon dioxide from air with purity between 71% and 100%.

13. A system comprising:

a direct air capture system, wherein the direct air capture system captures carbon dioxide gas via gas/liquid contact;

a multistage compression system that receives the captured carbon dioxide gas from the direct air capture system and transforms the carbon dioxide gas into sub and supercritical carbon dioxide fluid; and a mobile or stationary refrigerant system using the sub and supercritical carbon dioxide fluid to provide cooling and heating.

14. The system of claim 13, wherein a base mixture for the direct air capture system comprises:

a-phase transfer catalyst, wherein the phase transfer catalyst comprises a radical cation and a radical anion, the radical cation comprises a quaternary ammonium cation ($NR_4^+$), and the radical anion comprises at least one of a Hydroxide anion ($OH^-$), a fluoride anion ($F^-$), an Iodide anion ($I^-$), a Carbonate anion ($CO_3^{2-}$), or a Bicarbonate anion ($HCO_3^-$).

15. The system of claim 13, wherein a base mixture for the direct air capture system comprises one or more of the following:

a free amino acid, or a sodium, potassium, ammonium, or quaternary ammonium salt of amino acid.

16. The system of claim 13, wherein a base mixture for the direct air capture system comprises:

a base with common structure of $Q^+X^-$, where $Q^+$ is a cation of one or more of potassium, ammonium, sodium, calcium, vanadium, titanium, lithium, boron, or quaternary ammonium, and $X^-$ is an anion of one or more of hydroxide, carbonate, bicarbonates, borates, and titanates.

17. The system of claim 13, wherein a base mixture for the direct air capture system comprises one or more of the following:

a free amine, or a salt of any primary, secondary and quaternary amine.

18. The system of claim 13, wherein a base mixture for the direct air capture system comprises:

a solvent system comprising water or a mixture of water/glycerol, water/glycols, water/polyols, water/alcohols to capture carbon dioxide from air with purity between 71% and 100%.

* * * * *